United States Patent
Fox et al.

(10) Patent No.: US 8,430,788 B2
(45) Date of Patent: Apr. 30, 2013

(54) EPICYCLIC GEAR SYSTEM WITH FLEXPINS

(75) Inventors: Gerald P. Fox, Massillon, OH (US); Douglas Lucas, Uniontown, OH (US)

(73) Assignee: The Timken Company, Canton, OH (US)

( * ) Notice: Subject to any disclaimer, the term of this patent is extended or adjusted under 35 U.S.C. 154(b) by 268 days.

(21) Appl. No.: 12/988,986

(22) PCT Filed: Apr. 24, 2009

(86) PCT No.: PCT/US2009/041628
§ 371 (c)(1),
(2), (4) Date: Oct. 21, 2010

(87) PCT Pub. No.: WO2009/134684
PCT Pub. Date: Nov. 5, 2009

(65) Prior Publication Data
US 2011/0039654 A1 Feb. 17, 2011

Related U.S. Application Data

(60) Provisional application No. 61/049,247, filed on Apr. 30, 2008.

(51) Int. Cl.
*F16H 57/08* (2006.01)
(52) U.S. Cl.
USPC .......................................................... 475/347
(58) Field of Classification Search .................. 475/347; 74/411; 384/559, 550; 403/31, 409.1
See application file for complete search history.

(56) References Cited

U.S. PATENT DOCUMENTS

| 1,843,463 A | * | 2/1932 | Tawresey | 29/898.08 |
| 2,439,284 A | * | 4/1948 | Buckwalter | 384/559 |

(Continued)

FOREIGN PATENT DOCUMENTS

| EP | 0 003 894 A | 9/1979 |
| GB | 2 413 836 A | 11/2005 |

(Continued)

OTHER PUBLICATIONS

The Timken Company, "Rolling Mill Equipment", Copyright 1987, Cover, Table of Contents and pp. 36-37.

*Primary Examiner* — Dirk Wright
(74) *Attorney, Agent, or Firm* — Polster, Lieder, Woodruff & Lucchesi, L.C.

(57) ABSTRACT

A flexpin assembly (B) for an epicyclic gear system (A) includes a flexpin (20) that at one end is cantilevered from a carrier end wall (12) and a sleeve (22) that surrounds the flexpin and is cantilevered from the flexpin at the other end of the flexpin. In addition, the assembly has an antifriction bearing (24) for supporting a planet pinion (6) around the sleeve. The flexpin has a base (30) that is configured to be anchored to a carrier wall, a head (32) to which the sleeve is attached, and a shank (34) located between the base and head. The sleeve has a mounting segment (78) that is connected to the head of the flexpin without a weld. Both may have tapered surfaces secured in contact by a plate (66) clamped against the mounting portion with screws (68) that thread into the head, thus enabling the sleeve to be detached from the pin. The head may have a cylindrical surface (72) over which the mounting segment of the sleeve fits with an interference fit exists. The bearing may have rolling elements (106, 108) that surround raceways (86, 88) on the sleeve and a rib ring (94) that confines the rolling elements axially, but can be detached. The flexpin assembly is easily disassembled to facilitate servicing of the gear system.

16 Claims, 4 Drawing Sheets

U.S. PATENT DOCUMENTS

| | | | |
|---|---|---|---|
| 2,578,650 A * | 12/1951 | Wright | 475/158 |
| 2,666,676 A * | 1/1954 | Rhine | 384/473 |
| 2,980,474 A * | 4/1961 | Lucina | 384/559 |
| 3,033,597 A * | 5/1962 | Miller | 403/15 |
| 3,303,713 A * | 2/1967 | Hicks | 74/411 |
| 3,890,020 A * | 6/1975 | Thomas | 384/559 |
| 4,158,972 A * | 6/1979 | Chamberlain | 475/337 |
| 4,829,718 A * | 5/1989 | Behm | 451/342 |
| 5,558,594 A * | 9/1996 | Lefranc et al. | 475/347 |
| 5,685,068 A * | 11/1997 | Bankestrom et al. | 29/898.07 |
| 5,685,650 A * | 11/1997 | Martinie et al. | 384/538 |
| 6,349,469 B1 * | 2/2002 | Larson | 29/898.07 |
| 6,770,007 B2 * | 8/2004 | Fox | 475/348 |
| 6,939,053 B2 * | 9/2005 | Nisley et al. | 384/538 |
| 6,994,651 B2 * | 2/2006 | Fox et al. | 475/335 |
| 7,056,259 B2 | 6/2006 | Fox | |
| 7,063,490 B2 * | 6/2006 | Ricker | 411/14 |
| 7,297,086 B2 | 11/2007 | Fox | |
| 7,806,799 B2 * | 10/2010 | Smook et al. | 475/344 |
| 7,866,894 B2 * | 1/2011 | Hewitt | 384/556 |
| 8,192,323 B2 * | 6/2012 | Fox | 475/347 |
| 2010/0077881 A1 * | 4/2010 | Hicks | 74/411 |
| 2011/0053730 A1 * | 3/2011 | Fox et al. | 475/347 |
| 2011/0082005 A1 * | 4/2011 | Fox et al. | 475/347 |
| 2012/0040797 A1 * | 2/2012 | Fox | 475/347 |

FOREIGN PATENT DOCUMENTS

| | | |
|---|---|---|
| JP | 60 065940 | 4/1985 |
| WO | WO2007/016336 | 2/2007 |

* cited by examiner

EPICYCLIC GEAR SYSTEM WITH FLEXPINS

CROSS REFERENCE TO RELATED APPLICATIONS

This application derives priority from and otherwise claims the benefit of U.S. Provisional Application 61/049,247, filed Apr. 30, 2008, and International Application PCT/US2009/041628, filed Apr. 24, 2009, and published under International Publication No. WO 2009/134684, both of which are incorporated herein by reference.

TECHNICAL FIELD

This invention in general relates to epicyclic gear systems and more particularly to epicyclic gear systems in which the planet pinions rotate about flexpins.

BACKGROUND ART

The typical epicyclic gear system has a sun gear, a ring gear surrounding the sun gear, and planet pinions located between and engaged with the sun and ring gears, and in addition, it has a carrier that provides pins about which the planet pinions rotate. A gear system so configured splits the torque transferred through the system into load paths equal in number to the number of planet pinions. This reduces the forces at each mesh and enables the system to transfer a large amount of power in a relatively compact configuration—or in other words, it has a high power density.

Often the ring gear remains fixed, leaving the carrier and sun gear to rotate. In such an arrangement power may be applied at one end of the carrier and delivered through the sun gear at a different velocity and torque. This holds true for the transmissions in wind turbines that harness the energy of the wind and convert it into electrical power.

Many epicyclic gear systems utilize a straddle-type of carrier in which the planet pinions rotate between two walls of the carrier on pins that extend between the walls, each being anchored at both of its ends in the walls. When torque is applied to the carrier at one of the end walls, the carrier will undergo a twist-like distortion, called carrier wind up, that skews its pins with respect to the sun and ring gears. This disturbs the mesh between the planet pinions and the sun and ring gears.

An epicyclic gear system in which the planet pinions are supported on and rotate about so-called "flexpins" mitigates the skewing. In this regard, a flexpin for a planet pinion at one end is anchored in and cantilevered from the wall of a carrier of which it is a part. The other or remote end of the flexpin has a sleeve fitted to it, with the sleeve extending back over but otherwise spaced radially from the flexpin. The sleeve forms part of or carries a bearing that supports one of the planet pinions. At the carrier wall the flexpin bends in one direction circumferentially relative the main axis of the system and at the opposite end bends circumferentially in the other direction, so that the sleeve remains parallel to the axis. In other words, flexpin technology employs a double cantilever to offset the skewing that would otherwise occur and thereby restores alignment at the meshes between the planet pinions and the sun and ring gears. See U.S. Pat. No. 7,297,086 and U.S. Pat. No. 6,994,651, which are incorporated herein by reference, for a further discussion of flexpin technology.

While a carrier that utilizes flexpins to support its planet pinions can have a single end wall to support the flexpins, the number of flexpins—and planet pinions as well—may be doubled by utilizing two end walls with flexpins fitted to each. See WO 2007/016336.

Irrespective of whether a carrier has flexpins mounted on a single wall or spaced apart walls, each flexpin must be anchored firmly in or to the carrier wall from which it projects and is cantilevered. For example, a simple interference fit may retain the flexpin as depicted in U.S. Pat. No. 6,994,651. Then again, the carrier wall may have a tapered bore and the flexpin a tapered end that fits into the bore and indeed beyond where it is provided with threads over which a nut threads. When the nut is turned down against the carrier wall, it draws the pin snugly into and secures it within the tapered bore, all as depicted in U.S. Pat. No. 7,056,259. Some flexpins have flanges along which they are anchored to the carrier wall with machine screws as depicted in WO 2007/016336.

The sleeves that extend back over the flexpins and provide or support the bearings on which the planet pinions rotate must be attached firmly to the remote ends of the flexpins. An interference between each sleeve and the remote end of its flexpin supplemented by a weld will work. Also, the sleeve and flexpin may be formed integral at the remote end of the flexpin. See U.S. Pat. No. 7,056,259. One requires welding metals that are difficult where the sleeve is case hardened. The other requires a complex machining operation.

Sometimes a planet pinion or its bearing becomes damaged. This typically requires replacement of the entire transmission of which the pinion or its bearing is a mere component. But replacing an entire transmission is not easily achieved and is costly, particularly when the transmission forms part of a wind turbine mounted high above the ground or off shore above the sea.

BEST MODES FOR CARRYING OUT THE INVENTION

Figure 1:
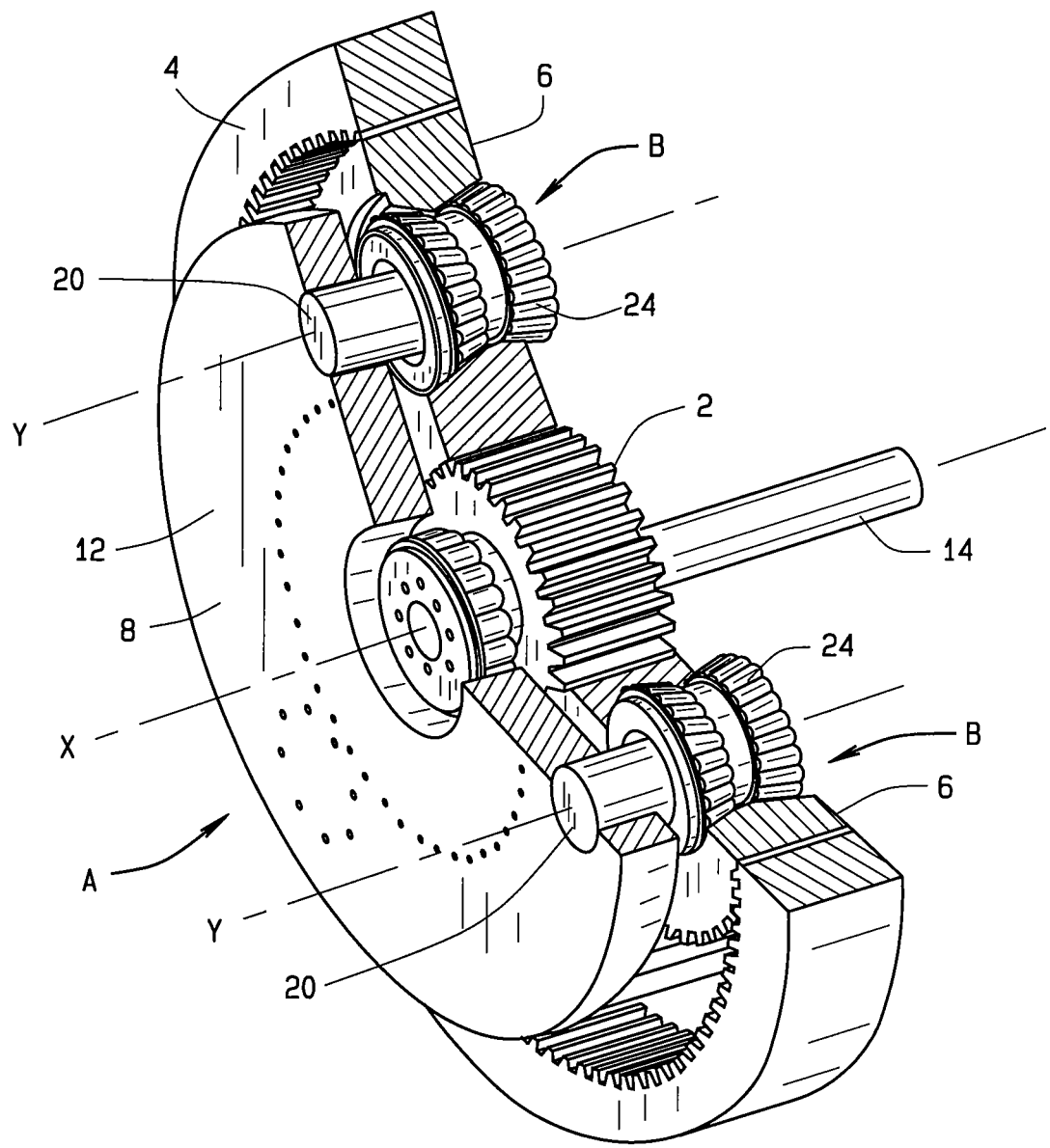
FIG. 1 is a perspective view, partially broken away and in section, of an epicyclic gear system constructed in accordance with an embodying the present invention.

Referring now to the drawings, an epicyclic gear system A (FIG. 1) that is organized about a central axis X, includes a sun gear 2, a ring gear 4, and planet pinions 6 located between and engaged with the sun gear 2 and ring gear 4. In addition, the transmission A includes a carrier 8 that establishes axes Y about which the planet pinions 6 rotate. Any one of the sun gear 2 or the ring gear 4 or the carrier 8 may remain fixed against rotation, while the other two rotate, torque being applied to one and delivered from the other. In the transmission A that is illustrated, typically torque is applied to the carrier 8 and delivered from the sun gear 2, while the ring gear 4 remains fixed. It is well suited use in a wind turbine between the wind-driven rotor and the electrical generator of the wind turbine. To this end, the carrier has an end wall 12 to which torque is applied, while the sun gear 2 has an output shaft 14 coupled to it.

Figure 2:
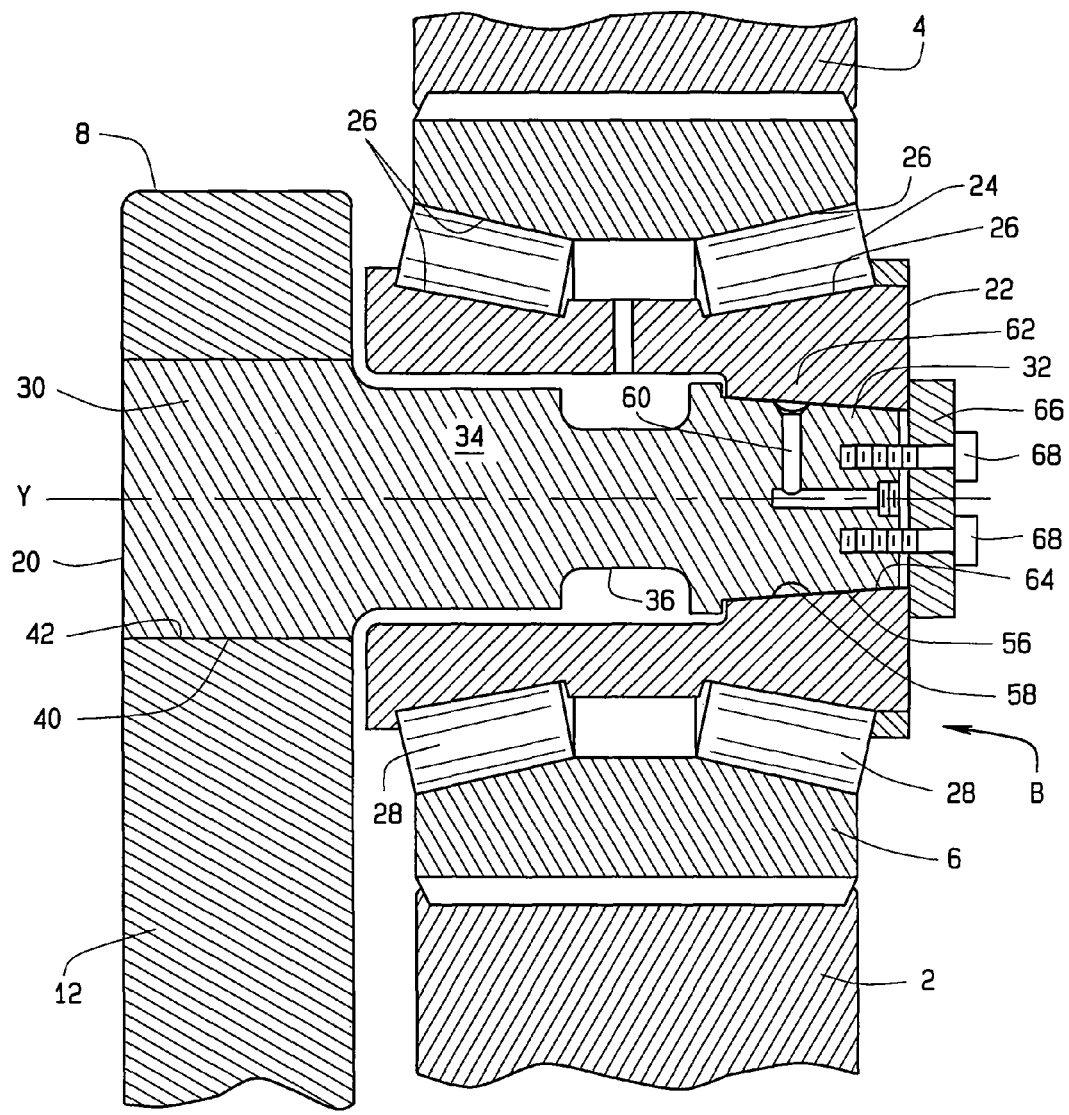
FIG. 2 is a longitudinal sectional view of a flexpin assembly forming part of the epicyclic gear system.
Figure 3:
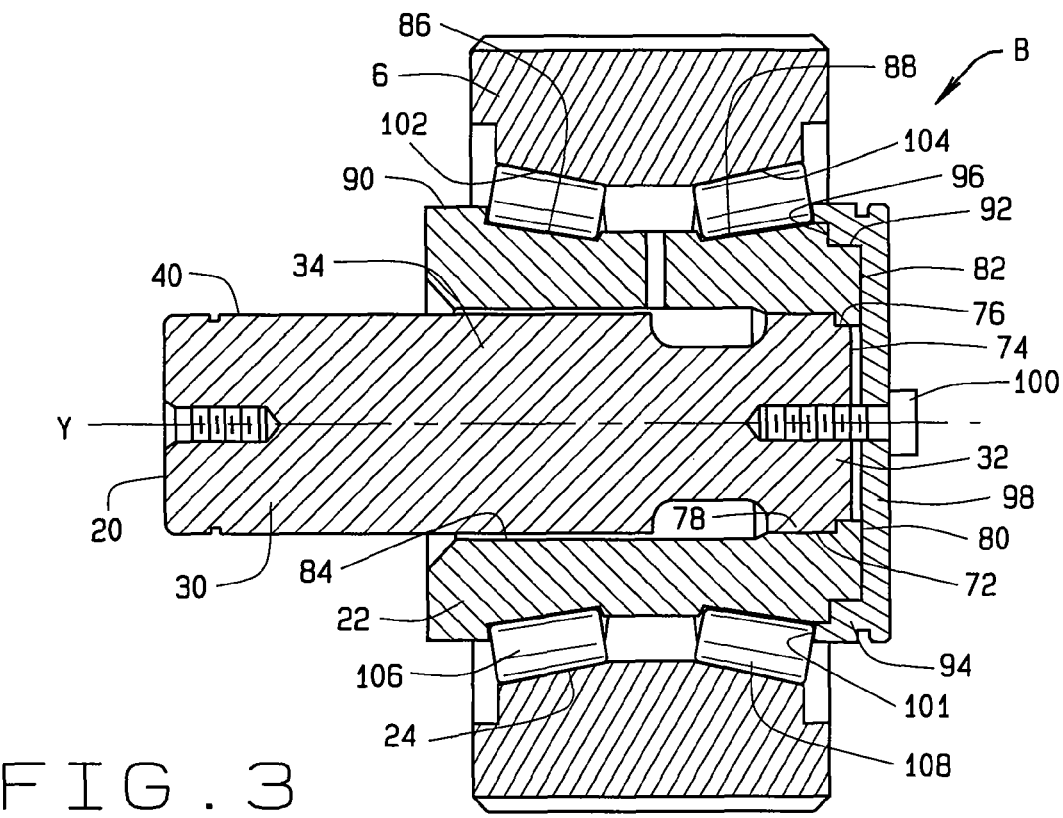
FIG. 3 is a sectional view of an alternative flexpin assembly.
Figure 4:
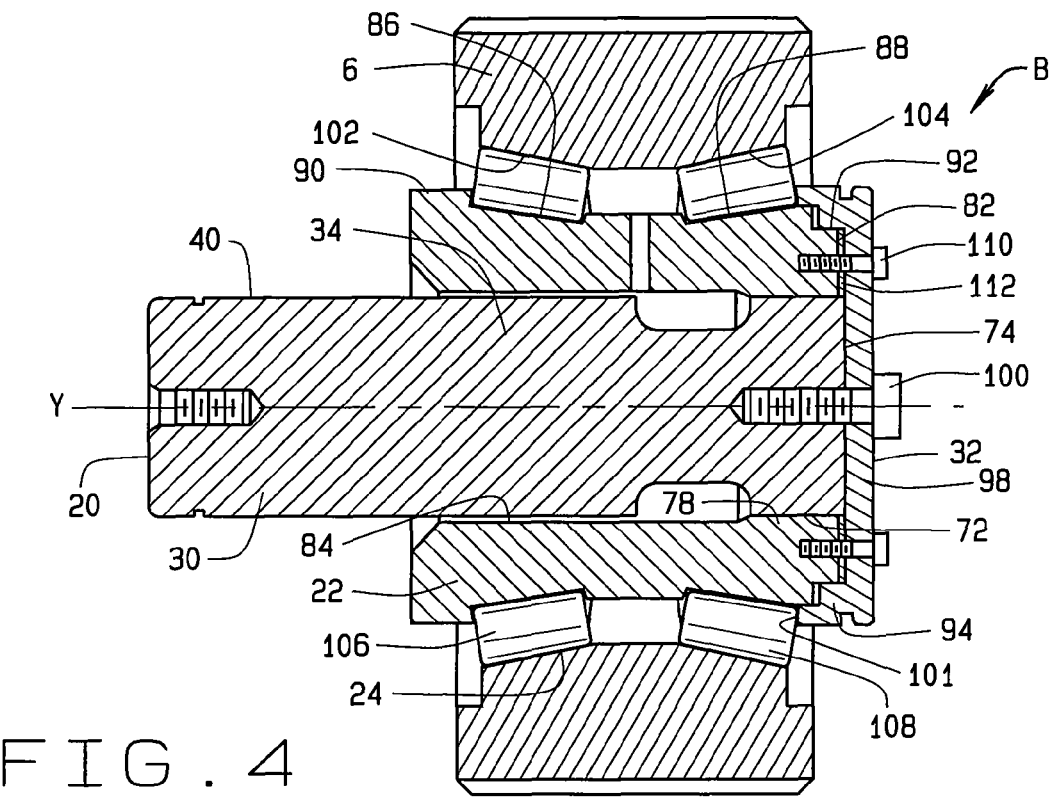
FIG. 4 is a sectional view of another alternative flexpin assembly.

In addition to the end wall 12, the carrier 8 has flexpins 20 that project from and indeed are cantilevered from the end wall 12, one flexpin 20 for each planet pinion 6. Each flexpin 20 at its end remote from the end wall 12 is fitted with a sleeve 22 (FIGS. 2-4) that extends back over the flexpin 20 towards the end wall 12, yet is spaced radially from flexpin 20 except at the remote end of the flexpin 20 where the sleeve 22 fits firmly and securely around the flexpin 20. In effect, the sleeve 22 is cantilevered from the remote end of the flexpin 20—creating a double cantilever so to speak.

The sleeve 22 along its outwardly presented surface supports a bearing 24 (FIG. 2), and the bearing 24 in turn supports one of the planet pinions 6. The bearing 24 may take the form of a double row tapered roller bearing with the sleeve 22 and pinion 6 providing raceways 26 along which tapered rollers 28 roll. Alternatively, the inner raceway 26 may reside on separate inner races called cones that fit snugly over the sleeve 22. The outer raceway 26 for the bearing 24 may be on the planet pinion 6 itself or on separate races, called cups, fitted into the planet pinion 6. Then again, the sleeve 22 may serve as a journal for a simple plain bearing. Should the bearing 24 take the form of an antifriction bearing, it need not be a tapered roller bearing. Indeed, it could take the form of a double row angular contact bearing, one or more deep groove ball bearings, a cylindrical roller bearing, a needle bearing, or a spherical roller bearing.

The flexpin 20, the sleeve 22 that it supports, and the bearing 24 that enables the pinion 6 to rotate on the sleeve 22, with or without the planet pinion 6, constitute a flexpin assembly B. When the inner raceways 26 for the bearing 24 are on the sleeve 22 itself, the flexpin assembly B is sometimes referred to as an "integrated flexpin."

The double cantilever formed by the flexpin 20 and the sleeve 24 that extends back over the flexpin 20 enables the offset axis Y about which the planet pinion 6 rotates to remain parallel to the central axis X. This in turn insures a good mesh between the planet gear 6 and the sun and ring gears 2 and 4. More specifically, as torque is applied to the end wall 12, each flexpin 20 deflects near the wall 12 generally circumferentially along the pitch circle defined by the several flexpins 20, so that its remote end trails the end that is anchored in the wall 12. The pin 20, however, possesses enough flexibility at its remote end to flex in the opposite direction circumferentially so as to enable the sleeve 22 to remain parallel to the central axis X. Contrast this with a straddle-type carrier with two walls in which each pin is anchored at both of its ends in the two walls. That type of carrier deforms under the torque transmitted through it, and the pins skew with regard to the central axis of the gear system.

The flexpin 20 for each planet pinion 6 has (FIG. 2) a base 30 at which it is fitted to the end wall 12 of the carrier 8 and a head 32 at which the sleeve 22 is fitted to the flexpin 20. Between the base 30 and the head 32 the flexpin 20 has a shank 34. The sleeve 22 extends over, yet is spaced radially from, the shank 34. To enhance the flexibility of the flexpin 20, its shank 34 may contain a groove 36 next to the head 32.

The flexpin 20 is anchored at its base 30 to the end wall 12 of the carrier 8 in any one of several ways. In this regard, the base 30 may have a cylindrical exterior surface 40 (FIG. 2), while the wall 12 opposite each planet pinion 6 has a cylindrical bore 42, the diameter of which is slightly smaller than the diameter of the surface 40, at least initially. The base 30 is pressed into the bore 42 so that an interference fit exists between its cylindrical surface 40 and the surface of the bore 42. In the alternative, the base 30 may have a tapered surface and beyond that surface a thread that projects beyond the carrier wall 12 where it is engaged by a nut as in U.S. Pat. No. 7,056,259, which is incorporated herein by reference. Also, the base 30 may have a flange that is secured to the carrier wall 12 with cap screws as in WO 2007/016336, which is likewise incorporated herein by reference.

At the remote end of the flexpin 20 the head 32 may have a tapered surface 56 (FIG. 2) that tapers downwardly away from the groove 36, so that its smallest diameter is at the very end of the flexpin 20. The head 32 contains a small annular groove 58 that opens out of the tapered surface 56 and an internal passage 60 that leads from the end face of the head 32 to the groove 58. The passage 60 opens out of the end face of the head 32 through an internal thread. The sleeve 22 at its end remote from the end wall 12 has an inwardly directed mounting segment 62 provided with a tapered surface 64 that provides a tapered bore conforming in size and taper to the tapered surface 56 on the head 32. The sleeve 22 fits over the flexpin 20—indeed, is pressed over head 32 of the flexpin 20—with the tapered surface 64 on its mounting segment 62 snugly against the tapered surface 56 on the head 32. The inclination of the two surfaces 56 and 64 is such that they establish a self-locking taper. The mounting segment 62 projects slightly beyond the end of the head 32, and here an end plate 66 bears against the end of the mounting segment 62, it being secured by cap screws 68 that pass through the plate 66 and thread into the head 32. When the screws 68 are tightened, they force the mounting segment 62 firmly over the head 32, causing the tapered surface 64 of the former to seat securely against the tapered surface 56 of the latter. This positions and retains the sleeve 22 along its mounting segment 62 firmly on the head 32 of the flexpin 30. Yet the sleeve 22, the planet pinion 6, and the bearing 24 may be removed as a unit and replaced should any one of those components require replacement. Owing to the self-locking taper, the removal of the cap screws 68 and the plate 66 normally will not free the sleeve 22.

However, once the end plate 66 is removed, the sleeve 32 is easily released by forcing a noncompressible fluid into the passage 60 from the threaded end of the passage 60. The fluid enters the annular groove 58 under pressure and expands the sleeve 32 at its mounting segment 62, thus separating the mounting segment 62 and head 32 at their tapered surfaces 56 and 64. This releases the sleeve 22, the bearing 24, and the pinion 6 from the flexpin 20 so that any one or all of those components may be repaired or replaced. The arrangement also facilitates manufacture and assembly of the gear system A.

The flexpin 20 may take a different form (FIG. 3) that still facilitates servicing and manufacture. In that form the base 30 may remain cylindrical and is configured to fit tightly into the cylindrical bore 42 of the carrier wall 12 with an interference fit between the cylindrical surface 40 of the base 30 and the surface of the bore 42, or it may assume some other configuration. The head 32 of the pin 20 also assumes a cylindrical configuration, it having a cylindrical peripheral surface 72 and an end face 74 that lies perpendicular to the axis Y. Actually, the cylindrical surface 72 runs out to the end face 74 at a small rabbet 76.

The sleeve 22 along its interior has a mounting segment 78 that fits over the cylindrical surface 72 of the head 22 with an interference fit and an inwardly directed flange or lip 80 at the end of the cylindrical surface 72. Here the sleeve 22 has an end face 82. The lip 80 fits into the rabbet 76 and positions the sleeve 22 such that its end face 82 lies slightly beyond the end face 74 of the flexpin 20. The remainder of the interior forms a bore 84, the surface of which is spaced radially slightly away from the shank 34 of the flexpin 20. On its exterior surface the sleeve 22 has two raceways 86 and 88 that taper downwardly toward each other, so that their least diameters are where they are closest. The raceway 86 surrounds the free end of the sleeve 22, that is, the end closest to the end wall 12, and here the sleeve 22 has an integral thrust rib 90 that projects outwardly beyond the large end of the raceway 84. The raceway 86 at its large end runs out to a rabbet 92 that surrounds the lip 90 and provides a machined shoulder that lies perpendicular to the axis Y.

The sleeve 22 carries a rib ring 94 that fits onto the rabbet 92 of the sleeve 22 and has a positioning surface 96 that bears against the machined shoulder of the rabbet 92. The rib ring 94 also has a plate-like web 98 that extends across the end face 82 of the sleeve 22 and across the end face 74 of the flexpin 20, yet is spaced slightly from the end face 74. It is secured to the flexpin 20 by a cap screw 100 that passes through the web 98 and threads into the flexpin 20. The web 98 captures the lip 80 of the sleeve 22 in the small rabbet 76 and prevents the sleeve 22 from creeping axially on the flexpin 20. Along its periphery the rib ring 94 projects out of the rabbet 92 and provides a rib face 101 at the large end of the raceway 88.

The two raceways 86 and 88 on the sleeve 22, the integral thrust rib 90 at the free end of the sleeve 22, and the rib ring 92 at the other end form part of the bearing 24. The planet pinion 6 that is supported by the flexpin 20 has two raceways 102 and 104 that also form part of the bearing 24. The raceway 102 surrounds the raceway 86 on the sleeve 22 and tapers in the same direction. The raceway 104 surrounds the raceway 88 on the sleeve 22 and tapers in the same direction as the raceway 88. Finally, the bearing 24 has rolling elements in the form of tapered rollers 106 arranged in a row between the raceways 86 and 102 with their large end faces against the thrust rib 90, and more tapered rollers 108 arranged in a row between the raceway 88 and 104 with the large end faces against the rib ring 94. The arrangement is such that the rollers 106 and 108 are on apex. As such, the conical envelopes within which the side faces of the rollers 106 lie and likewise the envelopes in which the tapered raceways 86 and 102 lie have their apices at a common point along the axis Y for the flexpin 20. The same holds true for the rollers 108 and their raceway 88 and 104. The bearing 24 when so configured transfers radial loads between the planet pinion 6 and the sleeve 22 and likewise confines the planet pinion 6 axially on the sleeve 22.

In effect, the bearing 24 is a double row tapered roller bearing. As such, the spacing between the thrust rib 90 and the rib face 101 of the rib ring 94 determines the setting for the bearing 24, whether it be end play or preload. That spacing—and likewise the setting—may be altered by grinding the rib ring 94 along its positioning surface 96 that bears against the machined shoulder of the rabbet 92.

In lieu of the tapered raceways 86, 88, 102, and 104 and the tapered rollers 106 and 108, the sleeve 22 may have a cylindrical raceway between its rib 90 and rib ring 94 and a cylindrical raceway carried by the planet pinion 6 and cylindrical rollers between the cylindrical raceways—in effect a cylindrical roller bearing instead of the double row tapered roller bearing 24. It too would have a detachable rib ring similar to the rib ring 92.

Should the pinion 6 or the tapered rollers 106 or 108 require replacement or repair, they are easily detached from the flexpin 20 simply by removing the cap screws 98 and withdrawing the rib ring 94 from the sleeve 22. Once the rib ring 94 is removed, the rollers 108 and the pinion 6 may be withdrawn from the sleeve 22. The arrangement also facilitates manufacture of the gear system A.

Figure 5:
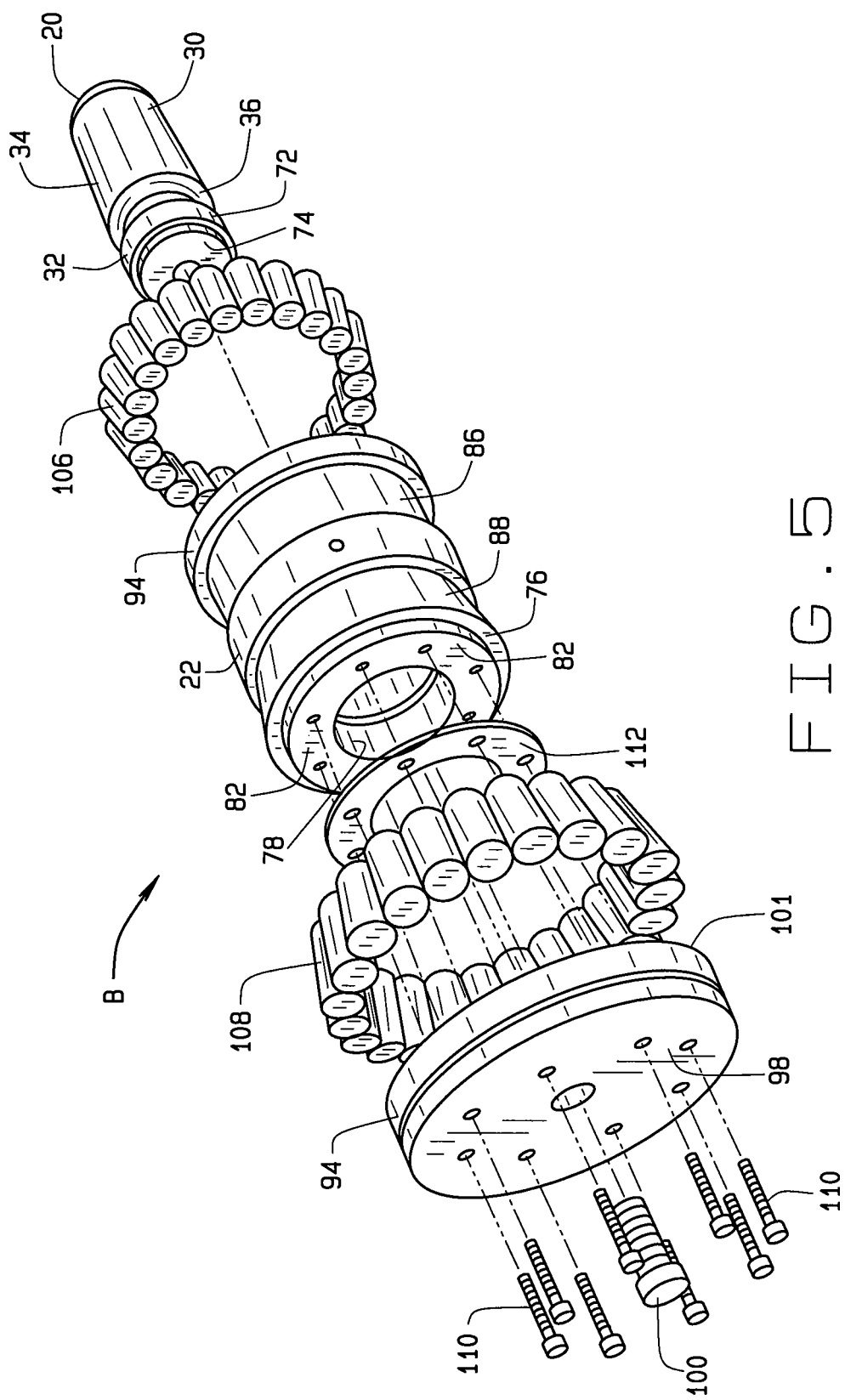
FIG. 5 is an exploded perspective view of the flexpin assembly of FIG. 4.

In another variation of the flexpin assembly B (FIGS. 4 and 5), the cap screw 100 clamps the web 98 of the rib ring 94 against the end face 74 of the head 32 on the flexpin 20. Moreover, the rib ring 94 and sleeve 22 are attached with more cap screws 110 that pass through the web 98 and thread into the sleeve 22 around its mounting segment 78. The cap screws 110 serve to rigidify the rib ring 92 at its periphery and this further stabilizes its rib face 101. They also serve to prevent the sleeve 22 from creeping axially on the head 32 of the flexpin 20, this in lieu of the small rabbet 76 and lip 80. Between the end face 82 of the sleeve 32 and the web 98 of the rib ring 94 lies an annular shim 112 that determines the axial position of the rib face 101 along the raceway 88. Thus, the shim 112 controls the setting for the bearing 24.

The sleeve 22, of course, contains threaded holes into which the cap screws 100 thread. Once the screws 110 are removed and the rib ring 94 is withdrawn from the sleeve 22, the threaded holes may be used to attach a puller to the sleeve 22, so that the sleeve 22 can be withdrawn from the head 32 of the flexpin 20.

Other threaded elements in lieu of the cap screw 100 may be used to secure the rib ring 94. For example, a threaded stud projecting axially from the end face 74 of the flexpin 20 and engaged by a nut will suffice. The same holds true for the cap screws 68 and 110.

The invention claimed is:

1. A flexpin assembly for installation on a carrier wall of an epicyclic gear system, said flexpin assembly comprising:
    a flexpin having a base and a head and a shank between the base and the head, the base being configured for securement to a carrier wall and the head having an end face;
    a sleeve having a mounting segment fitted firmly over the head of the flexpin and beyond the mounting segment surrounding the shank of the flexpin where it is spaced from the shank so that the flexpin may flex with respect to the sleeve, the sleeve being provided with an inner raceway and also having an end face;
    rolling elements surrounding the raceway on the sleeve for supporting a planet pinion on the sleeve;
    a rib ring on the sleeve where it projects outwardly beyond the raceway, with the rolling elements being against the rib ring, the rib ring having a plate-like web extended over the end faces of the flexpin and sleeve to retain the sleeve on the flexpin; and
    a threaded element passing through the web and securing the rib ring to the flexpin such that the web retains the sleeve on the flexpin, the threaded element upon removal permitting the rib ring and sleeve to be detached from the flexpin for servicing the sleeve and rolling elements.

2. A flexpin assembly according to claim 1 wherein the head of the flexpin has a tapered exterior surface and the mounting segment of the sleeve contains a tapered bore that conforms to the tapered surface and receives the head.

3. A flexpin assembly according to claim 2 wherein the inclination of exterior surface on the head and the inclination of the bore in the mounting section establish a self-locking taper.

4. A flexpin assembly according to claim 3 wherein the head of the flexpin contains an annular groove that opens out of its tapered surface and a passage that leads to the groove for supplying a pressurized fluid to the groove so as to dislodge the sleeve from the head.

5. A bearing assembly according to claim 1 wherein the sleeve also has a rib that projects outwardly beyond the raceway.

6. A flexpin assembly according to claim 1 wherein the threaded element is a screw that threads into the head of the flexpin at the end face of the flexpin.

7. A flexpin assembly according to claim 1 wherein the sleeve has an inwardly directed lip that is captured between the head of the flexpin and the web of the rib ring.

8. A flexpin assembly according to claim 1 wherein the sleeve has a rabbet between the inner raceway and the end face of the sleeve; and wherein the rib ring fits into the rabbet.

9. A flexpin assembly according to claim 1 wherein a shim lies between the sleeve and the rib ring to control the setting for the bearing.

10. A flexpin assembly according to claim 9 wherein the shim lies between the end face of the sleeve and the web of the rib ring and screws extend through the web and through the shim and thread into the sleeve.

11. An epicyclic gear system that is organized about a main axis and comprises:
 a sun gear located along the main axis;
 a ring gear surrounding the sun gear;
 planet pinions located between and engaged with the sun and ring gears;
 a carrier including an end wall and also planet assemblies according to claim 1, with the flexpins of the planet assemblies at their bases being secured to the end wall and the planet pinions being supported on the rolling elements that are around the sleeves of the planet assemblies.

12. An epicyclic gear system according to claim 11 wherein the head of each flexpin has a tapered exterior surface and the mounting portion of the sleeve for the flexpin contains a tapered bore that conforms to the tapered surface and receives the head and the threaded element and plate or web retain the sleeve on the head of the flexpin.

13. A flexpin assembly for an epicyclic gear system, said assembly being organized about an axis and comprising:
 a flexpin having a base and a head and a shank between the base and the head;
 a sleeve located around the flexpin and having a mounting segment at the head of the flexpin, the mounting segment and head being in the absence of a weld fixed axially in position with respect to each other, the sleeve being spaced from the flexpin beyond the mounting segment to enable the pin to flex with respect to the sleeve;
 a plate-like web extended over the end of the flexpin and the end of the sleeve;
 a screw securing the or web to the flexpin, the screw upon removal permitting the sleeve to be withdrawn from the flexpin;
 a planet pinion surrounding the sleeve; and
 a bearing between the sleeve and the planet pinion and including an inner raceway on the sleeve, a rib ring to which the web is attached, the rib ring projecting outwardly beyond the raceway and providing a rib face along the raceway, and rollers located between the planet pinion and the raceway on the sleeve and having their ends against the rib face.

14. A flexpin assembly according to claim 13 wherein the head has an exterior surface that tapers downwardly toward the end of the flexpin and the mounting segment of the sleeve has an internal surface that is tapered and conforms to the exterior surface on the head; and wherein the end plate that is secured to the head bears against the sleeve to prevent the sleeve from moving off the tapered surface of the head.

15. A flexpin assembly according to claim 13 wherein the head of the flexpin contains an annular groove that opens out of the tapered surface of the head; and wherein the head also contains a passageway that leads to the groove, so that a fluid can be forced into the groove under pressure to dislodge the sleeve at its mounting segment from the head.

16. A flexpin assembly according to claim 13 wherein the raceway on the sleeve is one of two raceways on the sleeve and the raceways are inclined with respect to the flexpin, and further including a shim located between the web of the rib ring and the sleeve to control the setting of the bearing.

* * * * *